(12) United States Patent
Yafuso

(10) Patent No.: US 7,301,138 B2
(45) Date of Patent: Nov. 27, 2007

(54) METHOD AND APPARATUS FOR DUAL POLARIZATION IMAGING

(75) Inventor: Eiji Steven Yafuso, Carlsbad, CA (US)

(73) Assignee: General Atomics, San Diego, CA (US)

( * ) Notice: Subject to any disclaimer, the term of this patent is extended or adjusted under 35 U.S.C. 154(b) by 163 days.

(21) Appl. No.: 10/741,935

(22) Filed: Dec. 19, 2003

(65) Prior Publication Data

US 2007/0241265 A1   Oct. 18, 2007

(51) Int. Cl.
*H01J 40/14*  (2006.01)
*H01J 3/14*  (2006.01)
*G02B 27/28*  (2006.01)
*G02B 27/10*  (2006.01)

(52) U.S. Cl. .............. 250/225; 250/216; 359/499; 359/618

(58) Field of Classification Search .......... 250/208.1, 250/216, 225; 359/629, 636, 638, 641, 640, 359/483, 501, 500, 499, 497, 495, 618
See application file for complete search history.

(56) References Cited

U.S. PATENT DOCUMENTS

| | | | |
|---|---|---|---|
| 4,201,456 A * | 5/1980 | Wolbarsht | 353/101 |
| 5,135,183 A | 8/1992 | Whitney | 244/3.16 |
| 5,438,414 A | 8/1995 | Rust | 356/364 |
| 6,519,040 B1 | 2/2003 | Amos | 356/453 |
| 6,934,062 B2 * | 8/2005 | Iizuka | 359/204 |
| 2005/0174573 A1* | 8/2005 | Harvey et al. | 356/328 |

* cited by examiner

Primary Examiner—Georgia Epps
Assistant Examiner—Don Williams
(74) Attorney, Agent, or Firm—Fitch, Even, Tabin & Flannery

(57) ABSTRACT

An imaging system and method for dual polarization imaging is provided. In one implementation, an imaging system includes a field stop located at a first image plane for limiting an incident light ray bundle passing through an aperture thereof and a polarization discriminating element adapted to separate the incident light ray bundle into a first ray bundle having a first polarization traveling in a first direction and a second ray bundle having a second polarization traveling in a second direction. The system also includes an image detector located at a second image plane to receive the first and second ray bundles such that the first ray bundle forms a first image at a first region of the image detector and the second ray bundle forming a second image at a second region the image detector, the first and second images laterally displaced from each other at the second image plane.

30 Claims, 6 Drawing Sheets

METHOD AND APPARATUS FOR DUAL POLARIZATION IMAGING

The United States Government may have rights in this invention pursuant to Contract No. MDA972-02-C-0066 between the Defense Advanced Research Projects Agency and General Atomics.

BACKGROUND OF THE INVENTION

1. Field of the Invention

The present invention relates generally to optoelectronic imaging devices, and more specifically to optoelectronic imaging devices that provide two optical images having two respective polarizations.

2. Discussion of the Related Art

In certain imaging applications, it is desirable to use dual simultaneous images of light having different orthogonal polarizations of light emanating from a particular scene. One approach splits the optical image received at the imaging system into two optical branches or paths, each branch being a separate image having orthogonal polarizations. These separate images are imaged by separate image acquisition devices, such as charge-coupled device (CCD) imagers or other detector arrays. Common devices to split the optical image include the use of linear, circular or other polarization control elements that physically separate the orthogonal states such that independent optical branches can be used to acquire the polarized images.

However, such systems suffer from the lack of inherent alignment of the two optical branches when acquiring registered images, i.e., alignment and registration of the resulting images using separate detector arrays are difficult to maintain. Misalignment of one polarization branch relative to the other can result in different magnifications, orientations, rotations, and optical aberrations from one image to its orthogonal polarization counterpart. Additionally, physically separating the optical branches used in imaging the two polarizations mandates the presence of two independent image acquisition devices.

Another approach provides a dual image detector using a single specially adapted image acquisition device, such as described in U.S. Pat. No. 5,438,414, issued Aug. 1, 1995 to Rust. In this approach, the image is incident upon an integrated dual imaging detector on a single silicon chip. The chip includes a wafer of beamsplitting material (a birefringent element) with an optical mask of opaque strips that separates portions of incident light into orthogonal polarizations interleaved across a CCD. However, this approach blocks portions of the incident light in order to split the light into orthogonal polarizations without interference; thus, the resolution of the image is reduced. Accordingly, the two differently polarized images are interleaved on the CCD. Additional processing is also required to reconstruct the interleaved images into separate images having orthogonal polarizations.

Another approach, such as described in U.S. Pat. No. 5,135,183, issued Aug. 4, 1992 to Whitney, uses a birefringent element at an entrance aperture of a telescope that splits the incident light into dual images having orthogonal polarizations which are directed to different regions of a single photodetector array. However, in order to eliminate optical crosstalk between the two images, separate polarization filters (one for each orthogonal polarization) are provided in front of the respective portions of the photodetector array. However, in such systems, radiometric performance is limited by the extinction ratio performance of these polarization filters, which is often variable depending on wavelength and angle of incidence. For example, typical plate polarization filters commonly result in 100:1-200:1 extinction, and less commonly 1000:1 extinction, which tends to be angle and wavelength sensitive. Thus, any light escaping through the polarization filter which should have been eliminated or filtered becomes a significant source of image noise.

SUMMARY OF THE INVENTION

The invention advantageously addresses the needs above as well as other needs by providing an imaging system that separates incident light into differently polarized ray bundles, each directed to a separate region of a single image detector.

In one embodiment, the invention can be characterized as an imaging system including a field stop located at a first image plane for limiting an incident light ray bundle passing through an aperture thereof and a polarization discriminating element adapted to separate the incident light ray bundle into a first ray bundle having a first polarization traveling in a first direction and a second ray bundle having a second polarization traveling in a second direction. The system also includes an image detector located at a second image plane to receive the first ray bundle and the second ray bundle such that the first ray bundle forms a first image at a first region of the image detector and the second ray bundle forming a second image at a second region the image detector, wherein the first image and the second image are laterally displaced from each other at the second image plane.

In another embodiment, the invention can be characterized as a method for dual polarization imaging, and a means for accomplishing the method, the method including the steps of: limiting a size of an incident light ray bundle received at an imaging system at a first image plane; separating the incident light ray bundle into a first ray bundle having a first polarization traveling in a first direction and a second ray bundle having a second polarization traveling in a second direction; and receiving the first ray bundle at a first region of a image detector located at a second image plane to form a first image on the first region; and receiving the second ray bundle at a second region of the image detector located at the second image plane to form a second image on the second region; wherein the first image and the second image are laterally displaced from each other at the second image plane.

In a further embodiment, the invention may be characterized as an imaging system including a field stop located at a first image plane adapted to limit a size of an incident light ray bundle passing through an aperture thereof, collimating optics adapted to collimate the incident light ray bundle to the polarization discriminating element, and a birefringent element adapted to angularly refract the incident light ray bundle into a first ray bundle having a first polarization traveling in a first direction and a second ray bundle having a second polarization traveling in a second direction, the first polarization and the second polarization are orthogonal to each other. The system also includes focusing optics adapted to focus the first ray bundle and the second ray bundle to an image detector, the image detector located at a second image plane and adapted to receive the first ray bundle and the second ray bundle such that the first ray bundle forms a first image at a first region of the image detector and the second ray bundle forms a second image at a second region the image detector. The first image and the second image are laterally displaced from each other at the second image plane and do not overlap. The first image is continuous across the first region and the second image is continuous across the second region of the image detector. The field stop limits the incident light ray bundle such that a polarization filter is not required after the birefringent element to prevent crosstalk.

BRIEF DESCRIPTION OF THE DRAWINGS

The above and other aspects, features and advantages of the present invention will be more apparent from the following more particular description thereof, presented in conjunction with the following drawings.

Corresponding reference characters indicate corresponding components throughout the several views of the drawings.

DETAILED DESCRIPTION

The following description is not to be taken in a limiting sense, but is made merely for the purpose of describing the general principles of the preferred embodiments. The scope of the invention should be determined with reference to the claims.

Figure 1:
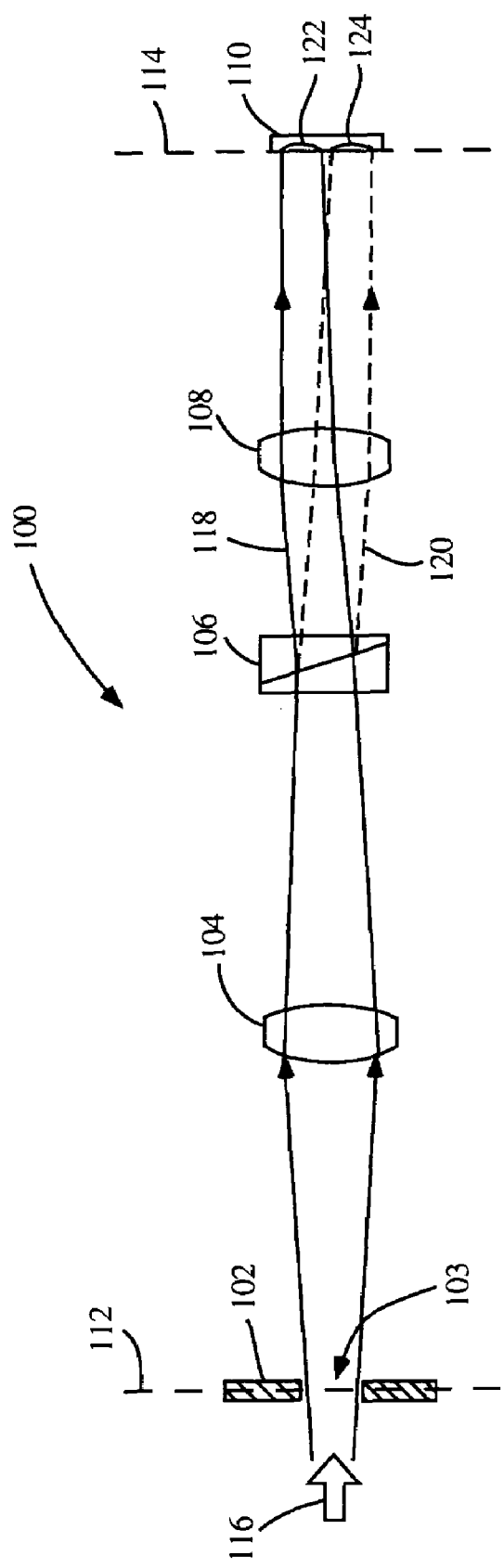
FIG. 1 is a diagram of an optical imaging system according to one embodiment of the invention.

Referring first to FIG. 1, a diagram is shown of an optical imaging system according to one embodiment of the invention. Illustrated is an imaging system 100 including a field stop 102 having an aperture 103, collimating optics 104, a polarization discriminating element 106, focusing optics 108 and an image detector 110. The field stop 102 is located at a first image plane 112, while the detector surface of the image detector 110 is located at a second image plane 114.

In accordance with several embodiments of the invention, an imaging system is provided that separates incident light into two polarization states that are simultaneously imaged at separate regions of the single image detector 110 without the need for polarizing filters to reduce crosstalk. In operation, an incident light ray bundle 116 (e.g., received at the entrance of an optical device, such as a optical telescope) passes through the optical aperture 103 of the field stop 102 toward the collimating optics 104. The incident light ray bundle 116 (which may also be referred to as incident radiation or an incident light beam) includes light having orthogonal polarizations. In other words, the incident light ray bundle 116 can be thought of as two identical ray bundles of light, identically traversing a volume in space, but which possess orthogonal polarization states. Being located at the first image plane 112, the field stop 102 limits the size of the incident light ray bundle that passes through the aperture 103, i.e., the open extent of the optical aperture 103 forms a hard stop for the system field of view. Preferably, the first image plane 112 occurs at the focus of an objective or other optical system.

The collimating optics 104 collimate the light ray bundle 116 and direct it toward the polarization discriminating element 106, such as a birefringent element. The polarization discriminating element 106 separates the light ray bundle 116 into a first ray bundle 118 having a first polarization traveling in a first direction and a second ray bundle 120 having a second polarization traveling in a second direction. In preferred embodiments, the polarization discriminating element 106 introduces a polarization state-based angular deviation between the first ray bundle 118 and the second ray bundle 120. For example, both the first ray bundle 118 and the second ray bundle 120 are refracted as they pass through the polarization discriminating element 106 such that there is a predetermined angular deviation between the first and second ray bundles. In another example, one of the ray bundles passes straight through the element 106, while the other ray bundle is refracted such that there is the predetermined angular deviation between the first and second ray bundles.

Preferably, the first polarization and the second polarization are orthogonal to each other, for example, the first and second polarizations are linear s and p states; however, it is understood that any pair of orthogonal polarization states could be utilized. Furthermore, the angular deviation $\phi$ (illustrated best in FIG. 4) between the first ray bundle 118 and the second ray bundle 120 is selected in order to image the first and second ray bundles at separate locations or regions on the same image detector 110, i.e., the first and second images are laterally displaced relative to each other on the image detector. In preferred embodiments, by minimizing the separation between the first ray bundle 118 and the second ray bundle 120 to the minimum necessary for full separation between full fields of view when imaged, it is possible to image the two polarizations using common optical elements.

Next, the focusing optics 108 (e.g., a focusing triplet) are used to bring the images to focus on the image detector 110 and to counteract or reduce any aberrations introduced by the element 106. The angular deviation caused by the polarization discriminating element 106 causes a first image 122 and a second image 124 to form on the surface of the image detector 110, which is located at the second image plane 114. The two separated images (i.e., the first image 122 and the second image 124) are distinguished by their polarization states of the electromagnetic radiation forming the images and, furthermore, in preferred embodiments, the two polarization states are orthogonal to each other.

Advantageously, the angular deviation of the first ray bundle 118 and the second ray bundle 120 is selected so that the first and second ray bundles traverse through the same optical elements (e.g., focusing optics 108), and are therefore highly constrained in alignment and registration to a common final image plane on the single image detector 110. By constraining both orthogonal states to a single optical system, it is possible to reduce the number of imaging devices or image detectors necessary to capture the independent images. Accordingly, as used herein, the image detector 110 may be any device or medium capable of detecting a spatial distribution of light intensity, such as a camera, photosensitive film, eye, detector array (such as a CCD), or any other generalized imaging detectors. This is in contrast to other known methods that require at least two sets of focusing optics and at least two image detectors, one for each polarization. Since the two polarizations are imaged on the same image detector 110, the problems of registration and alignment in traditional imaging devices are more easily overcome.

It is noted that the first ray bundle 118 forms the first image 122 on a first region of the image detector 110, while the second ray bundle 120 forms the second image 124 on a second region of the image detector 110. In preferred embodiments, the first and second images (and thus, the first and second regions of the image detector) are non-overlapping on the image detector 110. For example, each of the first and second images (and thus, the first and second regions) are laterally displaced from each other. Each image also extends continuously (in an uninterrupted manner) across its respective region of the image detector. Furthermore, preferably, portions of the first and second ray bundles 118 and 120 reaching the image detector 110 are not blocked at the polarization discriminating element 106 from reaching the image detector 110. In many applications, it is desired that the first image 122 and the second image 124 do not overlap such that spatial information about the scene that the incident light is emanating from can be derived in the processing of the detected images. Thus, the first and second images are laterally displaced such that there is a predetermined separation therebetween on the surface of the image detector. Alternatively, the first and second images (and thus, the first and second regions of the image detector) may be designed to overlap. That is, the first and second images are laterally displaced from each other, but at least a portion of the first and second images overlap. It is noted that even with overlap, each of the first image and the second image still extend continuously across their respective regions of the image detector. In preferred embodiments as an imaging system, the angular separation from the polarization discriminating element 106 is such that the first and second images (and thus, the first and second regions) do not overlap. It is noted that even in alternative embodiments where there is overlap, there remain portions of the first and second images (and thus, first and second regions) that do not overlap. In one implementation using the imaging system 100, the amount of light in each image is varied over time to provide range discrimination; however, such techniques are not further described herein.

Additionally, by providing a field stop 102 at the first image plane 112 in the optical path prior to the polarization discriminating element 106 to limit the system field of view, polarization filters are not required between the image detector 110 and the element 106 to eliminate crosstalk. Without such a field stop prior to the polarization discriminating element 106, the size of the incident light ray bundle 116 is not limited; thus, the first ray bundle and the second ray bundle would overlap each other and require an additional polarization filters to separate the two images at a detector plane to avoid crosstalk. Disadvantageously, radiometric performance is limited by the extinction ratio performance of such polarization filters, which is often variable depending on wavelength and angle of incidence. For example, typical plate polarization filters result 100:1-200:1 extinction, and less commonly 1000:1 extinction, which tends to be angle and wavelength sensitive. Thus, any light escaping through the polarization filter which should have been eliminated or filtered becomes a significant source of image noise. Several embodiments of the present invention obviate this limitation on radiometric performance through the use of an intermediary field stop at an image plane prior to the polarization discriminating element 106 and the elimination of subsequent polarization filters.

The polarization discriminating element 106 may comprise any optical element that optically separates incident light into at least two polarization states, each separated state at an angular deviation with respect to each other. In one embodiment, the element 106 is a birefringent element which separates light into two diverging ray bundles referred to as ordinary and extraordinary ray bundles, as is well known in the art. In preferred form, the element 106 takes the form of a Wollaston prism which is a polarizing prism that comprises two birefringent prisms cemented such that they deviate two emerging ray bundles (which are mutually perpendicularly polarized) by substantially equal amounts in opposite directions. Other types of birefringent elements that may be used as the polarization discriminating element 106 include Thompson, Glan Thompson, Glan Laser, Rochon and Foster prisms, as known in the art. Furthermore, devices other than birefringent elements or prisms may be used as the polarization discriminating element. For example, in one embodiment, the polarization discriminating element 106 comprises a thin film polarizer tilted at angle alpha relative to the path of the incident rays (including s and p polarized light). In operation, the thin film polarizer transmits p-polarization with no angular deviation while reflecting s-polarization at two times the angle alpha, resulting in an angular separation between transmitted and reflected polarization states of 2*alpha. Although this polarizer is not a birefringent material, it relies on the inherently birefringent nature of reflection and transmission at a dielectric boundary.

Figure 4:
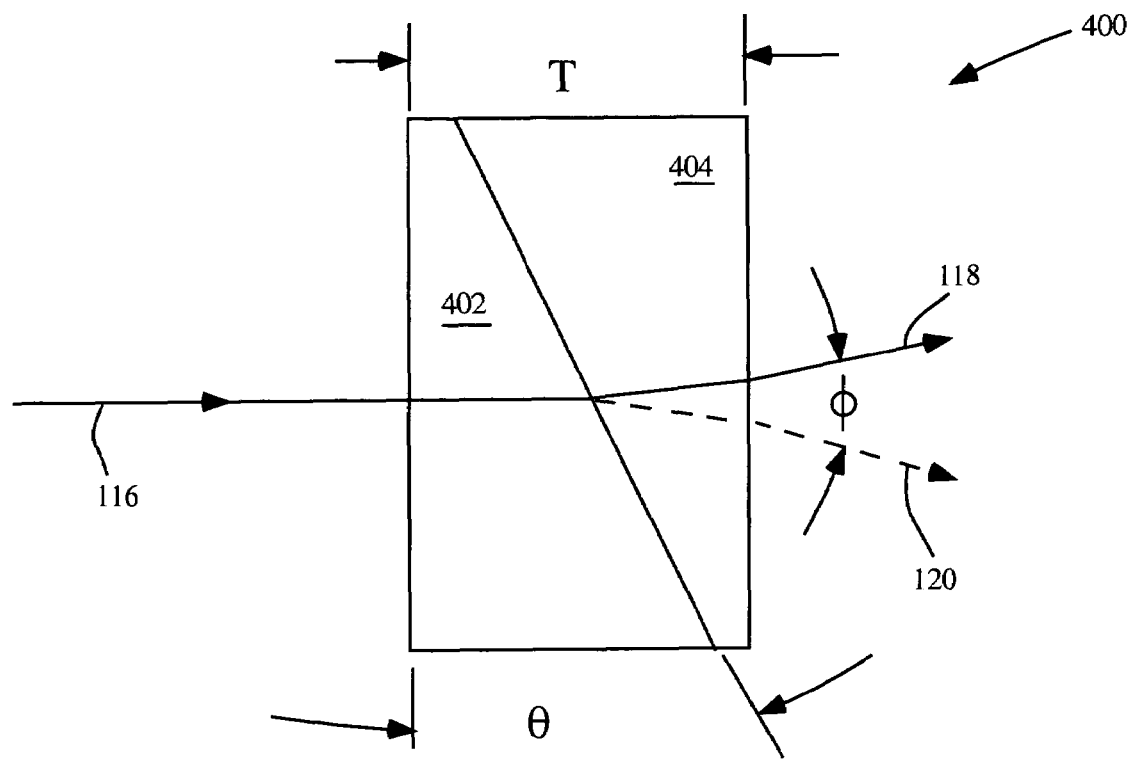
FIG. 4 is a diagram of a birefringent prism for use in one embodiment of the systems of FIGS. 1-3.

A preferred Wollaston prism 400 for use as element 106 is illustrated in FIG. 4. For example, the Wollaston prism 400 has a thickness T of 20 mm and a wedge angle θ of 17 degrees. However, it is noted that an imaging system in accordance with one or more embodiments of the invention could use nearly any form of birefringent prism element and is not constrained to particular dimensions or a particular wedge angle. The Wollaston prism 400 is fabricated from two wedges 402, 404 of calcite, a negative uniaxial birefringent material with a nominal ordinary index of refraction $n_o$ of 1.658 and extraordinary index of refraction $n_e$ of 1.486, which with the 17 degree wedge angle θ produces approximately a 5.7 degree additional angular separation φ between the oppositely polarized ray bundles 118 and 120 (illustrated as individually deviated light rays).

Accordingly, the wedge angle θ (e.g., 17 degrees) is carefully selected to ensure a proper predetermined angular separation φ between the first ray bundle 118 and the second ray bundle 120 (e.g., a 5.7 degree symmetric angular separation φ between s and p polarizations of the first and second ray bundles, respectively), such that the subsequently positioned focusing optics 108 form the first image 122 and the second image 124 of the complete field of view side by side on separate regions of the same image detector 110, preferably without overlap or crosstalk. It is noted that the above dimensions and materials are by way of example, and it is understood that depending on the exact configuration and purpose of the imaging system, these dimensions, particularly, the wedge angle θ to cause the predetermined angular separation angle φ may be varied, as long as it is sufficient to provide the proper angular separation φ to ensure that the first and second images 122, 124 are imaged on the single image detector 110. This specific example is designed for use with 1.064 micron light generated by a NdYAG laser system, however, the approach is generally applicable to any wavelength range.

Referring back to FIG. 1, it is also noted that the collimating optics 104 and the focusing optics 108 are each illustrated as a single optical lens. However, it is understood that such optics may each comprise one or more optical lens. For example, in preferred embodiments, the collimating optics 104 are a collimating triplet (illustrated in FIG. 3), while the focusing optics 108 are a focusing triplet (illustrated in FIG. 3), such as a Cooke triplet, as is well known in the art.

It is also noted that in some embodiments, one or both of the collimating optics 104 and the focusing optics 108 may not be needed. For example, if the incident light ray bundle is not in collimated space, then a birefringent element (used as element 106) will introduce aberrations in the first and second ray bundles 118 and 120. If the incident light ray bundle 116 were already in collimated space upon entering the imaging system 100, i.e., the scene being imaged is located a large distance from the system 100, then the collimating optics between the field stop 102 and the element 106 may be unnecessary. However, in preferred embodiments, collimating optics 104 are used to collimate the light reaching the element 106 to reduce any aberrations introduced in the element 106.

Furthermore, depending on the degree of optical aberrations acceptable in the first and second images 122 and 124, the focusing optics 108 may not be needed. That is, when a birefringent element is used as the polarization discriminating element 106, the birefringent element may introduce aberrations in the first and second ray bundles 118 and 120. Generally, the focusing optics 108 serve to counteract or reduce these aberrations while bringing the images into focus on the image detector 110. Depending on the degree of aberration (lack of focus, etc.) in the first and second images 122, 124 that is acceptable for a given system, the focusing optics may not be needed.

It is further noted that there may be other optical elements and/or image planes in the path from the field stop 102 to the image detector 110. Accordingly, when referring to the first and second image planes 112 and 114, it is understood that the second image plane 114 refers to an image plane subsequent to the first image plane along the path of ray bundle propagation such that an image detector is located the second image plane 114.

Accordingly, the system according to several embodiments of the invention provides for the simultaneous acquisition of orthogonal polarizations using a single imaging device for imaging. This allows for a compact and efficient utilization of space since duplicate focusing optics and image detectors are not required. It also reduces the number of components required since polarization filters are not required as well as improves radiometric performance of the imaging system.

Figure 2:
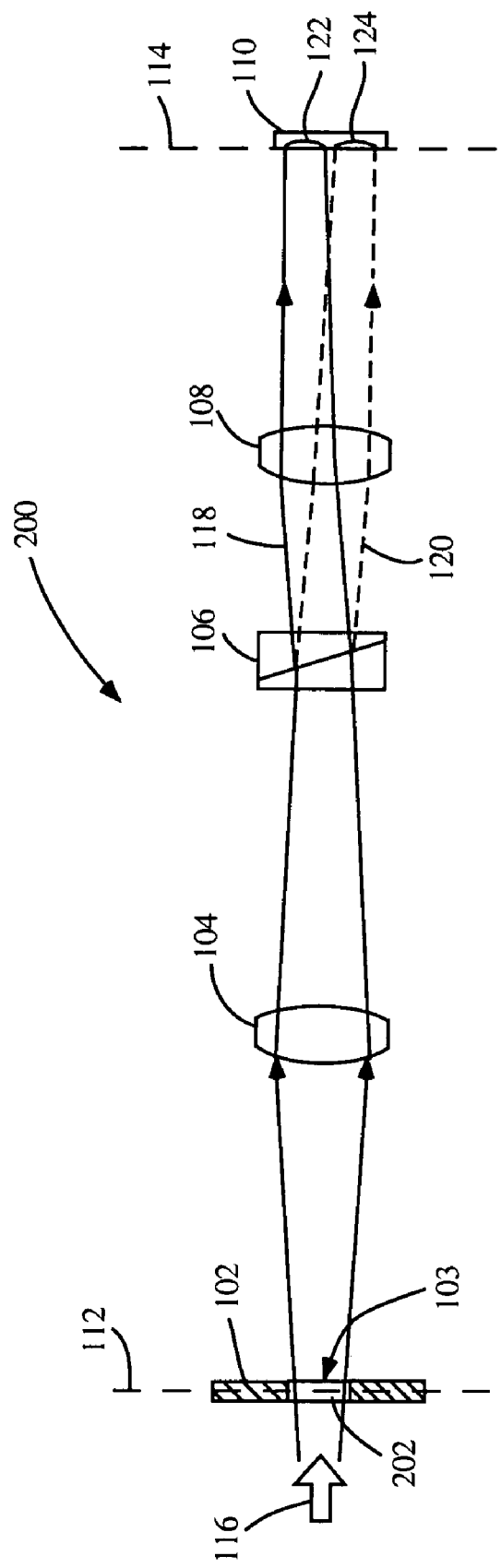
FIG. 2 is a variation of the optical imaging system of FIG. 1 according to another embodiment of the invention.

Referring next to FIG. 2, a variation is shown of the optical imaging system of FIG. 1 according to another embodiment of the invention. The imaging system 200 of FIG. 2 is similar to the system 100 of FIG. 1; however, a pockels cell 202 is located within the aperture 103 of the field stop 102. As is known in the art, the pockels cell 202 is an electro-optical crystal, which acts as a shutter with the application of an appropriate voltage across the crystal. Thus, in one state, the pockels cell 202 blocks the incident light ray bundle, while in another state, the pockels cell 202 allows the incident light ray bundle to pass through the aperture 103 toward the polarization discriminating element 106. Thus, with the appropriate potential applied thereto, the use of the pockels cell 202 controls the light being imaged by the imaging system 200.

Figure 3:
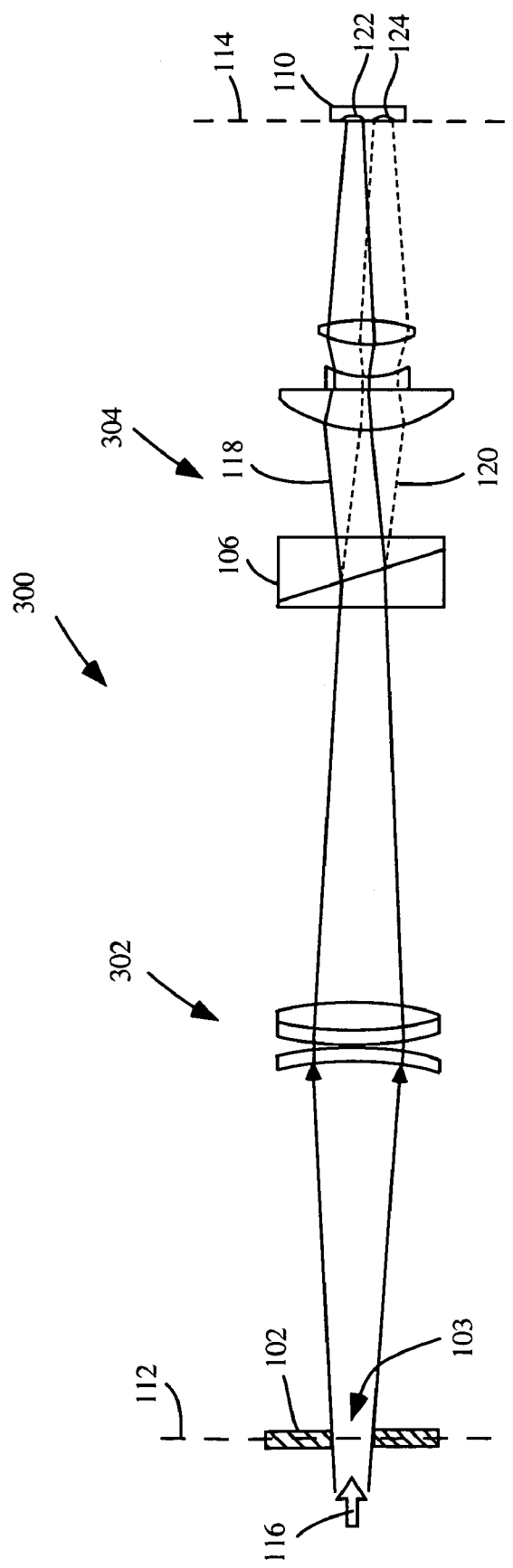
FIG. 3 is a further variation of the optical imaging system of FIG. 1 according to another embodiment of the invention.

Referring next to FIG. 3, a further variation is shown of the optical imaging system of FIG. 1 according to another embodiment of the invention. In this embodiment, a collimating triplet 302 is used for the collimating optics 104 of FIG. 1 and a focusing triplet 304 (also known as a Cooke triplet) is used for the focusing optics 108 of FIG. 1. The proper selection of the optics of the collimating triplet 302 and the focusing triplet 304 further reduce aberrations in the first and second images 122 and 124 at the image detector 110. It is also noted that the imaging system 300 may include the pockels cell 202, such as shown in FIG. 2.

Figure 5:
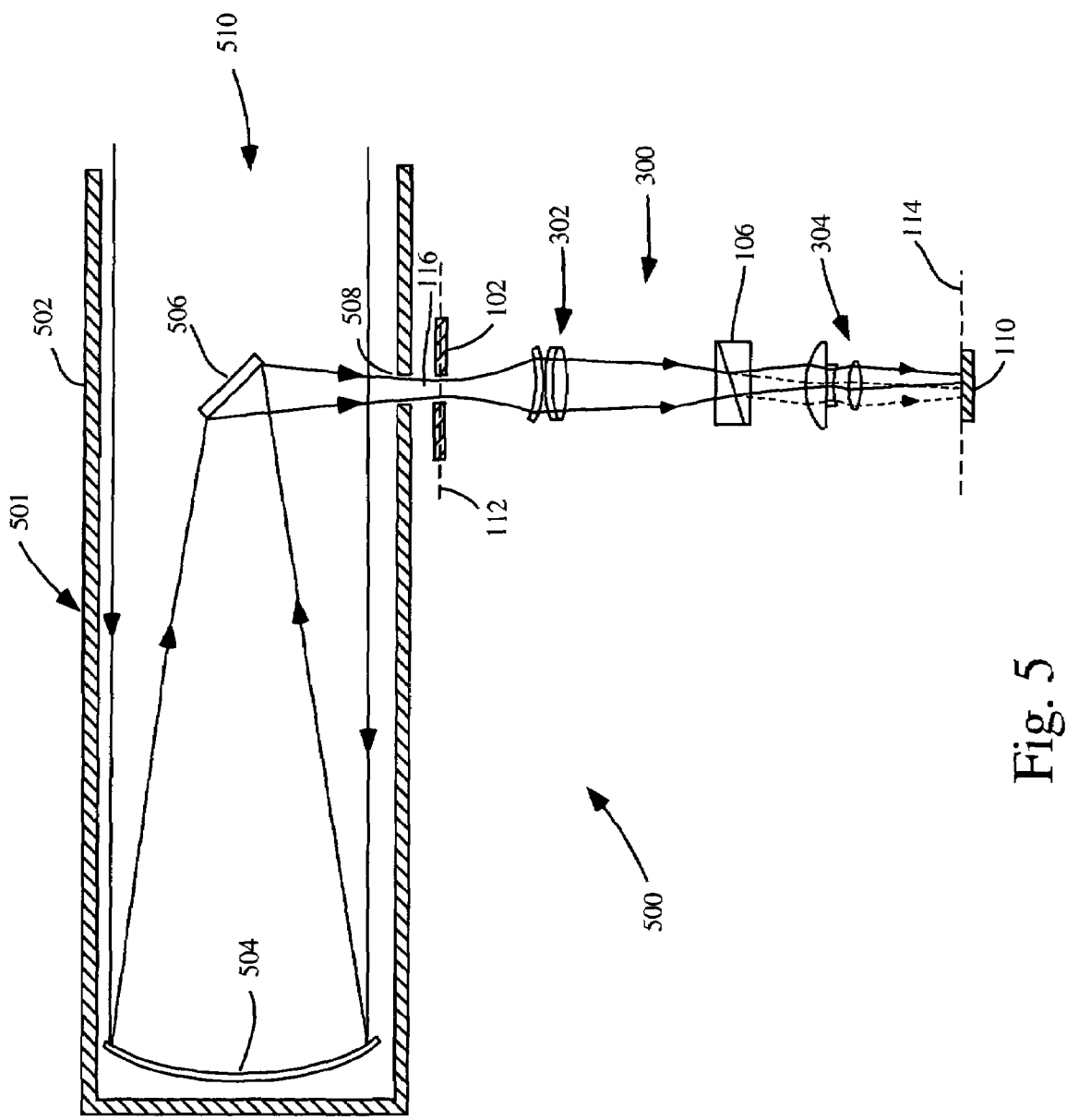
FIG. 5 is a diagram of one implementation in an optical imaging apparatus using the imaging system of FIG. 3.

Referring next to FIG. 5, a diagram is shown of one implementation in an optical imaging apparatus using the imaging system of FIG. 3. The apparatus 500 includes a telescope 501 providing the incident light ray bundle 116 to the imaging system 300. The telescope 501 includes a telescope body 502, a curved reflector 504, a flat reflector 506 and an aperture 508. The light emanating from the scene being imaged is received into an opening 510 of the telescope body 502, reflected at the curved reflector 504 back toward the flat reflector 506, which directs the incident light ray bundle 116 through the aperture 508 to the imaging system 300. It is noted that the imaging system 300 and its components are located such that the field stop 102 is at the first image plane 112 and the image detector 110 is at second image plane 114. It is further noted that the aperture 508 is not located at an image plane; thus, it does not limit the system field of view. As is known, the telescope 501 serves to collect the incident light ray bundle and direct it to the imaging system 300. It is also noted that any of the imaging systems and their variations as described herein may be used in place of the imaging system 300.

Figure 6:
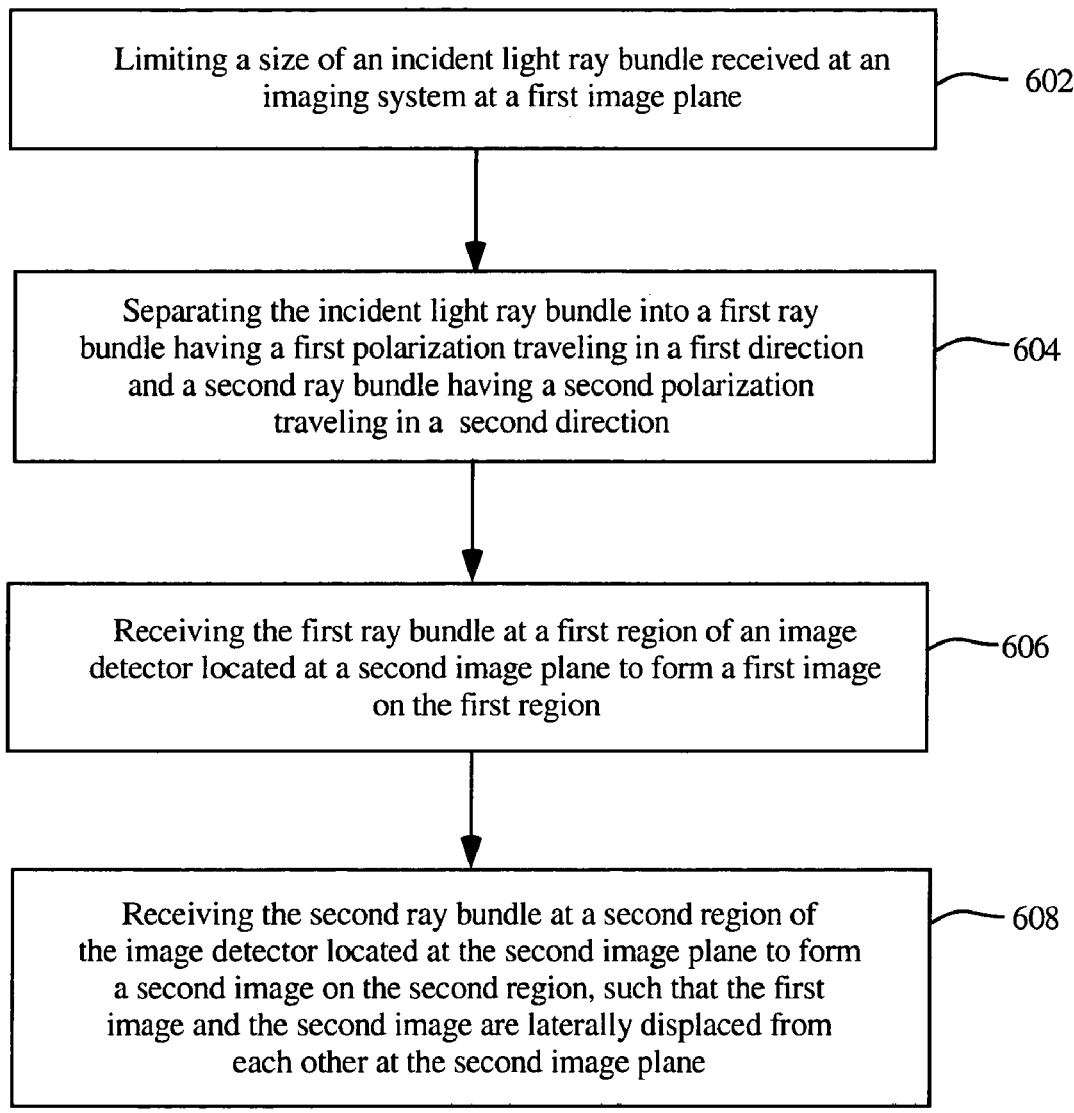
FIG. 6 is a flowchart illustrating the steps performed in accordance with one embodiment of the invention.

Referring next to FIG. 6, a flowchart is shown illustrating the steps performed in accordance with one embodiment of the invention. Initially, the size of an incident light ray bundle received at a first image plane of an imaging system is limited (Step 602). For example, the incident light ray bundle is passed through a field stop including an aperture or similar functioning device. Such step will eliminate the need for additional polarization filtering to be performed in the imaging system to prevent crosstalk.

Next, the incident light ray bundle is separated into a first ray bundle having a first polarization traveling in a first direction and a second ray bundle having a second polarization traveling in a second direction (Step 604). Typically, this separation is an angular separation between the first ray bundle and second ray bundle such that first ray bundle and the second ray bundle diverge at a desired separation angle (e.g., angular separation φ of FIG. 4). For example, a polarization discriminating element, such as a birefringent element or a Wollaston prism or other devices as described herein, may be used cause an angular separation between first and second ray bundle, the first and second ray bundles having different polarizations (preferably orthogonal polarizations). That is, one or both of the first ray bundle and the second ray bundle are refracted by the polarization discriminating element.

Then, the first ray bundle is received at a first region of an image detector located at a second image plane to form a first image on the first region (Step 606), and the second ray bundle is received at a second region of the image detector located at the second image plane to form a second image on the second region, such that the first image and the second image are laterally displaced from each other at the second image plane (Step 608). Generally, the first and second images, as well as the first and second regions of the image detector, are continuous across the image detector, i.e., the first image extends continuously across the first region and the second image extends continuously across the second region. Furthermore, preferably, portions of the first and second ray bundles 118 and 120 reaching the image detector 110 are not blocked (e.g., at the polarization discriminating element 106) from reaching the image detector 110. In preferred embodiments, the first and second images (and thus, the first and second regions of the image detector) are laterally displaced and do not overlap on the surface of the image detector. Thus, there is a predetermined separation distance between the first and second images (and first and second regions). Alternatively, the first and second images (and thus, the first and second regions of the image detector) are laterally displaced and overlap on the surface of the image detector; however, there are still non-overlapping portions. It is noted that since the incident light ray bundle is limited in step 602, additional polarization filtering is not required after the separating step 604 to reduce crosstalk at the image detector.

These steps provide a broad method according to one embodiment of the invention and may be practiced by one or more of the systems and their variations as described herein. In a further embodiment, an additional step of collimating the incident light ray bundle prior to the separating step 604 may be performed. For example, ensuring that the incident light ray bundle is in substantially collimated space for the separating step 604 reduces any aberrations during the separating step 604. It is noted that the collimating step preferably occurs after the limiting step 602 and before the separating step 604. Alternatively, the first image plane may be located at such a distance from an object to be imaged that the incident light ray bundle is nearly collimated.

In further embodiments, additional steps include focusing the first ray bundle to the first region of the image detector to form the first image on the first region, and focusing the second ray bundle to the second region of the image detector to form the second image on the second region. The focusing steps occur after step 604 and before step 606.

In preferred embodiments, both the additional collimating and focusing steps are performed. It is further noted that additional steps may be performed such that the method will still be in accordance with several embodiments of the invention.

While the invention herein disclosed has been described by means of specific embodiments and applications thereof, numerous modifications and variations could be made thereto by those skilled in the art without departing from the scope of the invention set forth in the claims.

What is claimed is:

1. An imaging system comprising:
   a field stop located at a first image plane for limiting an incident light ray bundle passing through an aperture thereof;
   a polarization discriminating element adapted to separate the incident light ray bundle into a first ray bundle having a first polarization traveling in a first direction and a second ray bundle having a second polarization traveling in a second direction; and
   an image detector located at a second image plane to receive the first ray bundle and the second ray bundle such that the first ray bundle forms a first image at a first region of the image detector and the second ray bundle forming a second image at a second region the image detector,
   wherein the first image and the second image are laterally displaced from each other at the second image plane, and
   wherein the field stop limits a size of the incident light ray bundle at the first image plane such that a polarization filter is not required after the polarization discriminating element to prevent crosstalk.

2. The system of claim 1 further comprising:
   focusing optics adapted to focus the first ray bundle and the second ray bundle to the image detector.

3. The system of claim 1 wherein the first image is continuous across the first region and the second image is continuous across the second region of the image detector.

4. The system of claim 1 wherein the first image and the second image do not overlap at the image detector.

5. The system of claim 1 wherein a portion of the first image and the second image overlap and a portion of the first image and the second image do not overlap at the image detector.

6. The system of claim 1 further comprising:
   collimating optics adapted to collimate the incident light ray bundle to the polarization discriminating element.

7. The system of claim 1 wherein the polarization discriminating element comprises a birefringent element.

8. The system of claim 1 wherein the polarization discriminating element comprises a wollaston prism.

9. The system of claim 1 wherein the polarization discriminating element is adapted to separate the incident light ray bundle such that the first polarization and the second polarization are orthogonal to each other.

10. The system of claim 1 wherein the polarization discriminating element is adapted to refract the incident light ray bundle into the first ray bundle and the second ray bundle.

11. A method for dual polarization imaging comprising:
    limiting a size of an incident light ray bundle received at an imaging system at a first image plane;
    separating the incident light ray bundle into a first ray bundle having a first polarization traveling in a first direction and a second ray bundle having a second polarization traveling in a second direction;
    receiving the first ray bundle at a first region of an image detector located at a second image plane to form a first image on the first region; and
    receiving the second ray bundle at a second region of the image detector located at the second image plane to form a second image on the second region;
    wherein the first image and the second image are laterally displaced from each other at the second image plane, and
    wherein the limiting step comprises limiting the size of the incident light ray bundle at the first image plane such that polarization filtering is not required after the separating step to prevent crosstalk.

12. The method of claim 11 further comprising:
    focusing the first ray bundle to the first region of the image detector to form the first image on the first region; and
    focusing the second ray bundle to the second region of the image detector to form the second image on the second region.

13. The method of claim 11 wherein the first image is continuous across the first region and the second image is continuous across the second region of the image detector.

14. The method of claim 11 wherein the first image and the second image do not overlap at the image detector.

15. The method of claim 11 wherein a portion of the first image and the second image overlap and a portion of the first image and the second image do not overlap at the image detector.

16. The method of claim 11 further comprising:
    collimating, before the separating step, the incident light ray bundle.

17. The method of claim 11 wherein the separating step comprising:
    using a birefringent element to separate the incident light ray bundle.

18. The method of claim 11 wherein the separating step comprising:
    using a wollaston prism to separate the incident light ray bundle.

19. The method of claim 11 wherein the first polarization and the second polarization are orthogonal to each other.

20. The method of claim 11 wherein the separating step comprises:
    refracting the incident light ray bundle into the first ray bundle having the first polarization traveling in the first direction and the second ray bundle having the second polarization traveling in the second direction.

21. A system for dual polarization imaging comprising:
    means for limiting a size of an incident light ray bundle received at an imaging system at a first image plane;
    means for separating the incident light ray bundle into a first ray bundle having a first polarization traveling in a first direction and a second ray bundle having a second polarization traveling in a second direction;
    means for receiving the first ray bundle at a first region of an image detector located at a second image plane to form a first image on the first region; and
    means for receiving the second ray bundle at a second region of the image detector located at the second image plane to form a second image on the second region;
    wherein the first image and the second image are laterally displaced from each other at the second image plane, and
    wherein the means for limiting comprise:
    means for limiting the size of the incident light ray bundle at the first image plane such that polarization filtering is not required to prevent crosstalk.

22. The system of claim 21 further comprising:
    means for focusing the first ray bundle to the first region of the image detector to form the first image on the first region; and
    means for focusing the second ray bundle to the second region of the image detector to form the second image on the second region.

23. The system of claim 21 wherein the first image is continuous across the first region and the second image is continuous across the second region of the image detector.

24. The system of claim 21 wherein the first image and the second image do not overlap at the image detector.

25. The system of claim 21 wherein a portion of the first image and the second image overlap and a portion of the first image and the second image do not overlap at the image detector.

26. The system of claim 21 further comprising:
    means for collimating the incident light ray bundle to the means for separating.

27. The system of claim 21 wherein the first polarization and the second polarization are orthogonal to each other.

28. The system of claim 21 wherein the means for separating comprise:
    means for refracting the incident light ray bundle into the first ray bundle having the first polarization traveling in the first direction and the second ray bundle having the second polarization traveling in the second direction.

29. An imaging system comprising:
    a field stop located at a first image plane adapted to limit a size of an incident light ray bundle passing through an aperture thereof;
    collimating optics adapted to collimate the incident light ray bundle to the polarization discriminating element;
    a birefringent element adapted to angularly refract the incident light ray bundle into a first ray bundle having a first polarization traveling in a first direction and a second ray bundle having a second polarization traveling in a second direction, the first polarization and the second polarization are orthogonal to each other;
    focusing optics adapted to focus the first ray bundle and the second ray bundle to an image detector;
    the image detector located at a second image plane and adapted to receive the first ray bundle and the second ray bundle such that the first ray bundle forms a first image at a first region of the image detector and the second ray bundle forms a second image at a second region the image detector;
    wherein the first image and the second image are laterally displaced from each other at the second image plane and do not overlap;
    wherein the first image is continuous across the first region and the second image is continuous across the second region of the image detector; and
    wherein the field stop limits the incident light ray bundle such that a polarization filter is not required after the birefringent element to prevent crosstalk.

30. The system of claim 29 wherein the birefringent element comprises a wollaston prism.

* * * * *

UNITED STATES PATENT AND TRADEMARK OFFICE
CERTIFICATE OF CORRECTION

| | | |
|---|---|---|
| PATENT NO. | : 7,301,138 B2 | Page 1 of 1 |
| APPLICATION NO. | : 10/741935 | |
| DATED | : November 27, 2007 | |
| INVENTOR(S) | : Yafuso | |

It is certified that error appears in the above-identified patent and that said Letters Patent is hereby corrected as shown below:

Column 9, Line 56 (approximately); after the word "region" insert the word -- of --.

Signed and Sealed this

Twenty-ninth Day of April, 2008

JON W. DUDAS
*Director of the United States Patent and Trademark Office*